Patented Aug. 29, 1933

1,924,107

UNITED STATES PATENT OFFICE 1,924,107

ZINC CHLORATE WEEDKILLER

Ralph N. Chipman, Bound Brook, N. J., assignor to Chipman Chemical Company, Inc., Bound Brook, N. J., a Corporation of New York No Drawing. Application March 28, 1931
Serial No. 526,137

7 Claims. (Cl. 167—45)

This invention undertakes to advance the art of weed-killing by rendering available a method and a material of higher herbicidal efficiency with regard to cost and effect than any heretofore resorted to by those skilled in this art.

The discovery of Teppet announced through his United States Patent No. 1,534,289 led to the adoption of non-poisonous sodium chlorate in lieu of the arsenic compounds previously resorted to. But, though more efficient, it involved a fire hazard so serious as to compel many of those who desired it, from the standpoint of efficiency, to feel disposed to revert to the arsenic compounds which, even though poisonous to live stock, at least were not combustion promoters.

These difficulties were in turn overcome by my discovery that chlorates of the alkaline-earth basis (announced through my United States Patent No. 1,694,205) were of even greater herbicidal efficiency and at the same time, by reason of their pronounced property of deliquescing, were safe to use; being non-poisonous unlike the arsenic compounds, and devoid of fire hazard unlike the chlorates of the alkali family.

In seeking still further to improve the herbicidal efficiency, while still avoiding the above-mentioned hazards, I have been led to the discovery that if the calcium chloride, heretofore combined with sodium chlorate, be replaced by zinc chloride, then can a more powerful lethal effect be achieved. Calcium chloride, per se, has but little ability to destroy weeds; whereas I have demonstrated that zinc chloride has the multiple advantage of being highly toxic per se, of being so deliquescent as to eliminate from sodium chlorate its element of fire hazard, of having an acrid taste and, therefore, unpalatable to live stock grazing on the weeds, and of not being objectionably corrosive to equipment.

Apart from the weed-killing considerations above outlined, there has for long existed a demand for some way or means for not only killing the existing weed growth and the secondary germination of the seeds thereof, but of also rendering the soil itself sterile as to all growth. The farmer wants an immediate effect and, above all, one which will not be followed by any impairment in the fertility of his soil. The railroads want both immediate and permanent effect, for no growth whatsoever is ever wanted on road-beds, highways, irrigation ditches, etc.

A primary aim of this invention is to satisfy, so far as possible, the demand for a permanent weed-killer; to wit, one that will eradicate existing growth and, at the same time, impair the fertility of the soil itself. This end has been, to a demonstrable extent, attained by the instant invention.

In carrying it into effect, sodium chlorate and zinc chloride are employed as the raw materials. It is not necessary that these be of a high order of purity. So long as they contain a goodly proportion of the essential ingredients ($NaClO_3$ and $ZnCl_2$) they will answer all practical requirements. This carries the advantage that they, especially zinc chloride, may be had at a relatively low cost. It may here be noted, however, that zinc chloride, as it comes commercially has a much lower order of toxicity than I have found can be developed. This, perhaps, is one reason why its latent possibilities have not sooner been recognized. That is to say, in commercial zinc chloride, there exists sufficient hydroxide to render it alkaline, and this basicity is opposed to toxicity; especially in association with chlorates.

For attaining the maximum efficiency for the more usual varieties of weeds and under average conditions of climate, what is wanted is an herbicidal agent and method of a universal type. The proposition on which this invention is based is that there should be on the leaves of the plant, and on its soil, zinc chloride closely associated, combined or transformed with sodium chlorate, together with an acidifying agent such as to overcome the alkalinity normally exhibited by the raw materials. The quantity to be applied need be no greater than two or three pounds of the herbicidal ingredients per square rod.

How these materials are to be applied will depend, of necessity, upon circumstances. Thus, zinc chloride in dried or calcined form may be mechanically mixed with the sodium chlorate to form a dry powder; together with enough of an acid salt, such as sodium acid sulphate, to adjust the hydrogen ion concentration to about four or thereunder. By reason of the amount of water that pre-dried zinc chloride can absorb before becoming pasty, such a powder will not cake in its containers and can be well handled by a dusting apparatus.

This avoids the transportation of water and the need of obtaining it on the site. The powder clings well to the weeds, and thereupon proceeds to draw water from it and from the air, through a process of deliquescence; forming a highly toxic solution out of the materials which is readily absorbed by the plant and results in its early death.

Or, the dry powder may, at the site, first be dissolved in water to form a solution which may be handled by any ordinary spray apparatus.

Or, the materials may be dissolved at the factory in water to form a concentrated (but not saturated) solution which may be transported and used directly without further dilution, or may be diluted for the sake of greater covering power where the weed growth is not too dense, too stubborn, or more or less scattered.

In the last-mentioned case, where the materials are not shipped in dry form, there is no need for resorting to a dry acid salt for adjusting the hydrogen ion concentration, and any acidulating liquid, such as a small percentage of sulphuric, hydrochloric or other readily available acid.

Preferably, but not necessarily, the materials may be mixed in molecular proportion with respect to their content of sodium chlorate and zinc chloride. It is believed that, under the conditions of high concentration, metathesis occurs through solution in large measure, if not wholly, as follows:

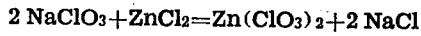
$$2 NaClO_3 + ZnCl_2 = Zn(ClO_3)_2 + 2 NaCl$$

The amounts used, if a solution is to be prepared, should be insufficient to permit the deposition or growth of crystals in the containers during transportation or storage, and yet should be sufficient to reduce the cost of shipping needless water. If, for example, a saturated solution of sodium chlorate be mixed (using molecular proportions) with a saturated solution of zinc chloride, there will result, through metathesis, a formation of sodium chloride which, being relatively less soluble than any of the other compounds, will deposit as salt crystals. A sufficient excess of water, will hold such salt in solution.

This transformation may be utilized in preparing solutions containing a diminished proportion of sodium chloride. The latter tends to stimulate the growth of certain types of weeds (of marine origin) and where the eradication of weeds in special areas infested with such, the preliminary precipitation of salt may be resorted to; the mother liquor being then somewhat diluted to ensure against further precipitation in transit.

Such a solution, it will be seen, contains zinc chlorate. This is highly deliquescent and is per se a powerful herbicide, and by its presence raises the efficiency of a solution made as aforesaid. The same applies to the dry mixture, when applied to the leaves, because it quickly draws water to form a solution in which the ingredients are dissolved and can transform either forthwith or progressively, with the absorption by the plant of the products.

Zinc chlorate combines the herbicidal effects of both sodium and chlorate and zinc chloride. In the former, it is the negative ion $ClO_3$ (while in the latter, it is the positive ion Zn) that is the more toxic component. The other product of the metathesis, Na Cl, for example, has a very low order of toxicity compared with either $NaClO_3$ or $ZnCl_2$, and a much feebler toxicity than $Zn(ClO_3)_2$. The same is true of other stable chlorides, i. e. notably those of the first chemical group, (alkali) and substantially also as to those of the second chemical group, alkali earths.

Zinc chlorate, as such, is not commercially available at the present time; the art being in possession of no practicable method of producing it. It can, however, be very cheaply formed in solution by the method I have proposed. For, most purposes, there is no need of isolating the zinc chlorate per se, but by taking out the NaCl by crystallization, this can be done.

Of the other metallic chlorates, those of iron and copper may in like manner be prepared. But the former is less toxic, and the latter more corrosive to metal and more costly, than zinc chlorate. The last-named has, therefore, been given as the best example of my invention.

Having thus revealed this invention, I claim:—

1. A method of killing weeds which consists in applying to the leaves and upper portions thereof an herbicide formed by compounding with zinc chloride an amount of sodium chlorate but in the ratio of about three to four by weight.

2. The art of forming a weed killing preparation which consists in compounding about four weights of sodium chlorate with three weights of zinc chloride and adding an acidifying agent in an amount sufficient to reduce below four the hydrogen ion concentration of an aqueous solution of the preparation.

3. A normally-dry weed killing powder characterized by a pronounced property for deliquescing at normal temperature and humidity and by an acrid taste repellent to cattle and but little corrosive to iron which consists of a small quantity of an acid salt and considerable amounts of dry zinc chloride and dry sodium chlorate.

4. The art of eradicating weeds which consists in distributing over a field thereof at the rate of about two to three pounds per square rod more or less a preparation made by compounding about three parts of zinc chloride with four parts of sodium chlorate and a fraction of an acidulating agent sufficient to reduce the hydrogen ion concentration of the preparation below a value of four.

5. The art of killing existing weeds on a field and simultaneously sterilizing the soil against the re-growth of plants from roots and seeds existing in the soil, which consists in applying both to the weeds and the soil covered thereby a preparation formed by compounding sodium chlorate with zinc chloride.

6. A method of killing weeds which consists in subjecting the leaves thereof to the action of the chlorate of zinc.

7. A herbicidal agent comprising as its essential ingredient chlorate of zinc together with minor inert impurities.

RALPH N. CHIPMAN.